United States Patent [19]

Smith et al.

[11] Patent Number: 4,572,782
[45] Date of Patent: Feb. 25, 1986

[54] LOADING DEVICE FOR GRANULAR MATERIAL

[75] Inventors: John H. Smith, Lamar; Otis Logan, Lynchburg, both of S.C.

[73] Assignee: Southern AG., Inc., S.C.

[21] Appl. No.: 684,026

[22] Filed: Dec. 20, 1984

[51] Int. Cl.$^4$ .................... B07B 1/00; B65G 67/00; B65G 11/00

[52] U.S. Cl. .................... 209/236; 209/254; 209/259; 209/352; 209/371; 209/420; 414/397; 193/3

[58] Field of Search .............. 209/236, 420, 421, 371, 209/372, 259, 255, 235, 237, 254, 352, 353, 354, 355, 315, 317, 234; 414/293, 299, 300, 339, 373, 397; 193/3, 17; 198/533

[56] References Cited

U.S. PATENT DOCUMENTS

| | | | |
|---|---|---|---|
| 31,096 | 1/1861 | Michael | 209/254 |
| 242,581 | 6/1881 | Austin | 209/420 |
| 302,720 | 7/1884 | Foreman | 209/255 |
| 600,594 | 3/1898 | Oldham | 209/420 |
| 997,854 | 7/1911 | Roberts | 209/353 X |
| 1,129,820 | 2/1915 | Trench | 209/420 |
| 1,149,989 | 8/1915 | Thompson | 209/353 |
| 1,212,849 | 1/1917 | Thompson | 209/236 X |
| 1,519,909 | 12/1924 | Frain et al. | 414/397 X |
| 2,908,391 | 4/1955 | Frevert | 209/315 |
| 3,370,705 | 12/1964 | Grulke | 209/259 X |
| 4,350,467 | 9/1982 | Soros | 414/144 |
| 4,400,268 | 8/1983 | Stache et al. | 209/420 X |
| 4,472,102 | 9/1984 | Behringer | 414/299 X |

FOREIGN PATENT DOCUMENTS

| | | | |
|---|---|---|---|
| 212642 | 9/1956 | Australia | 209/421 |
| 657631 | 1/1929 | France | 209/372 |

Primary Examiner—Frank W. Lutter
Assistant Examiner—Thomas M. Lithgow
Attorney, Agent, or Firm—Jordan B. Bierman

[57] ABSTRACT

A device for loading granular material containing some foreign matter into a container, such as a railroad car, has upper and lower chutes arranged in parallel. The upper chute has a bottom screen for allowing the foreign matter to fall through to the lower chute. The grain flow remaining on the upper chute is discharged down the center of the car and fills toward the sides, while the foreign matter falling to the lower chute is distributed evenly by sidewardly extending wings out toward the sides and in towards the center of the car. By the operation of the device, the foreign matter carried in the grain is evenly distributed and mixed throughout the car, and the tendency of the foreign matter to concentrate along the center under the hatchway of the car is prevented. A sample of the grain taken from the hatchway of the car thereby contains a truer percentage of foreign matter to grain than would occur by conventional loading devices.

7 Claims, 5 Drawing Figures

LOADING DEVICE FOR GRANULAR MATERIAL

BACKGROUND OF THE INVENTION

1. Field of the Invention

The invention relates to a device for loading granular material into railway hopper cars and evenly distributing any foreign matter carried therein.

2. Description of the Prior Art

Grain, such as soybeans, corn and wheat, is harvested by farmers using mechanical combines. When the combine picks up the grain, it also harvests and accumulates a certain amount of "trash", i.e. dirt, foreign matter, weed seeds, etc. The grain together with the trash is off-loaded from the combine into a truck. Since the trash tends to be of smaller size and lighter than the grain, it has a tendency to concentrate itself directly under the off-loading spout of the combine. The grain, which is heavier, flows more readily to the sides of the truck and contains the least amount of foreign matter at these locations.

The grain is then transferred by truck to a storage point, typically grain elevators. There, a sample of the grain is taken, the amount of foreign matter in the grain is determined, and that amount is subtracted from the price of the grain paid to the farmer. The truckload of grain is then placed in the elevator.

Further in the distribution process, the grain is transferred from the elevators into railroad cars. Typically, the grain in the elevator is pushed to the top of the elevator into a large pipe by means of an auger type system and is fed downward by gravity through the pipe into the railroad car. Railroad cars generally have a centrally located hatchway running the length of the top of the car. Once again the foreign matter tends to be concentrated directly under the hatchway. When the loaded car reaches its destination, a sample of the grain is taken, the percentage of foreign matter determined, and the elevator owner paid accordingly. Since the grain sample is taken through the open hatchway, the sample tends to have a greater amount of foreign matter as compared to other locations within the railroad car. Therefore, a true percentage of foreign matter in the grain is not obtained, and the sample shows erroneously a higher content of foreign matter than if the grain and foreign matter were mixed evenly in the railroad car.

SUMMARY OF THE INVENTION

Accordingly, it is a principal object of the invention to provide a device for loading grain into a transporting vehicle such as a railraod car. In particular, the intended result of the invention is to produce an even distribution of foreign matter and grain within the transporting vehicle. It is a further object of the invention to provide a grain loading device which is adjustable for different distribution characteristics and hatchway sizes.

In accordance with the invention, a loading device for granular material has two chutes in parallel, one above the other, with the upper chute having a screen for passing foreign matter in the grain through to the lower chute. The foreign matter together with some smaller grain or grain parts falling to the lower chute is then distributed evenly from the sides in toward the center of the car by means of two wings extending on both sides at a downward angle to the lower chute. The wings have holes over the lengths of their bottom panels, so that the foreign matter is distributed more or less evenly from the sides of the car in towards the center. Meanwhile, grain passing over the screen of the top chute is discharged towards the center of the car and fills in toward the sides by gravity. The combined flow of the two chutes results in a more even mixture of grain and foreign matter throughout the car than occurs by conventional loading devices.

The wings of the lower chute are arranged to be movable to a vertical position, for fitting through the hatchway of the railroad car. Within the car, they are opened outward by means of handles operated from the back end of the device. The length of the wings can be adjusted, and supporting rollers guiding the device along the top edges of the hatchway can be adjusted for different hatchway widths.

The above objects and the further features and advantages of the invention are described in detail below in conjunction with the drawings, of which:

DESCRIPTION OF THE PREFERRED EMBODIMENT

Figure 1:
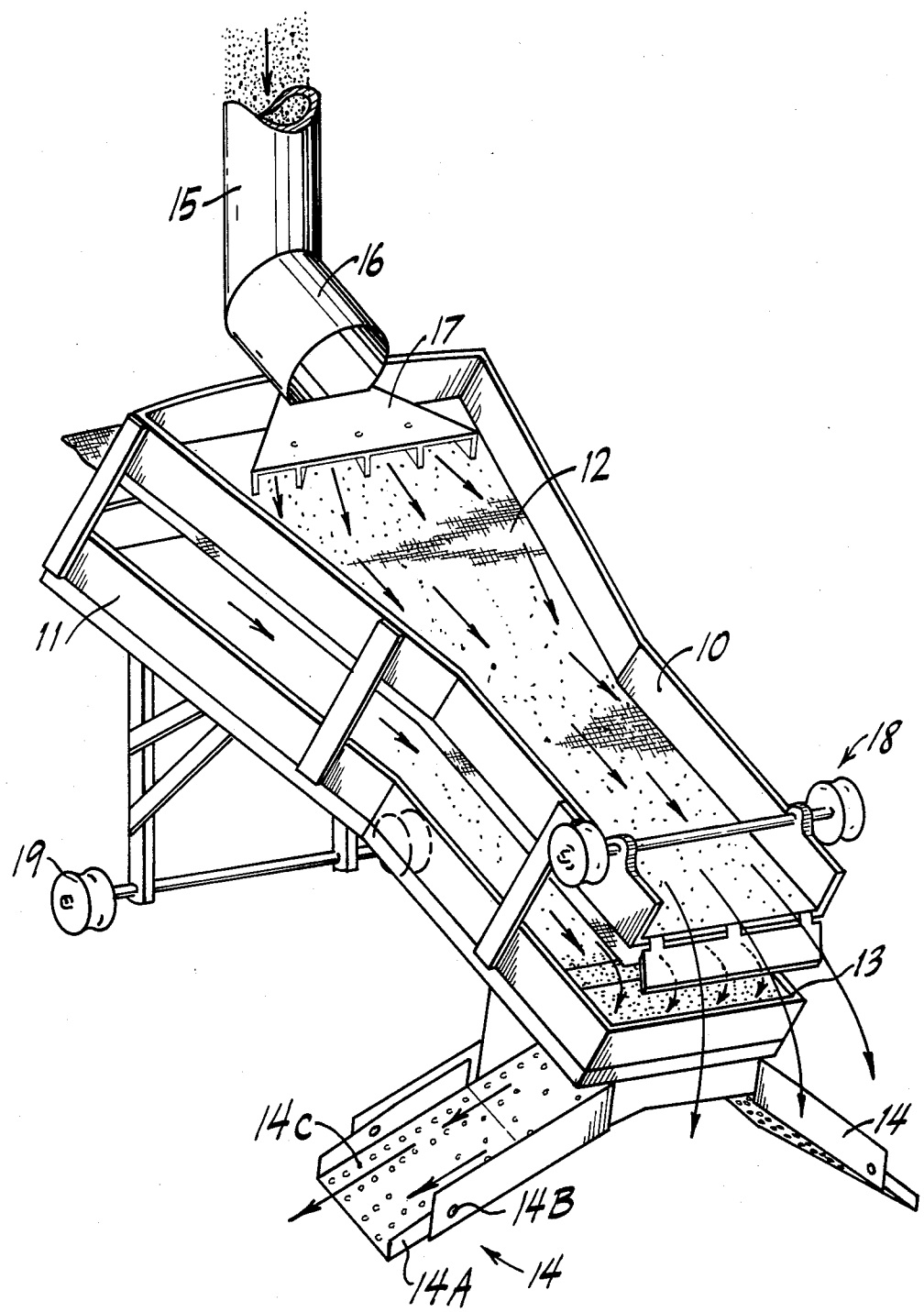
FIG. 1 is a perspective view of the loading and mixing device according to the present invention.

Referring to the drawings, and in particular to FIG. 1, the loading device according to the present invention has an upper chute 10 and a lower chute 11 arranged in parallel in two-tiered fashion. Upper chute 10 has a bottom screen 12 which has a mesh size which permits foreign matter and small grain or grain parts in the grain flow to fall through the screen to lower chute 11 while retaining the grain on the upper chute. The lower chute has a solid bottom and channels the foreign matter passed through screen 12 by gravity feed down to the front end of the device, where it falls through opening 13 and flows into wings 14 which are angled toward either side of the device. Grain is introduced througb loading tube 15 and collar 16 at the rear of the loader. Deflector grate 17 directs the flow of grain over the width of the upper chute at its upper end. Both chutes are dimensioned similarly, having a wider width at their upper ends and gradually tapering to a narrower width at their front ends. Front wheels 18 and rear wheels 19 are provided for guiding the loader longitudinally over rails on either side of the hatchway of the railroad car. The wheels are adjustable in their spacing widthwise in order to accommodate different hatchway widths.

Figure 2:
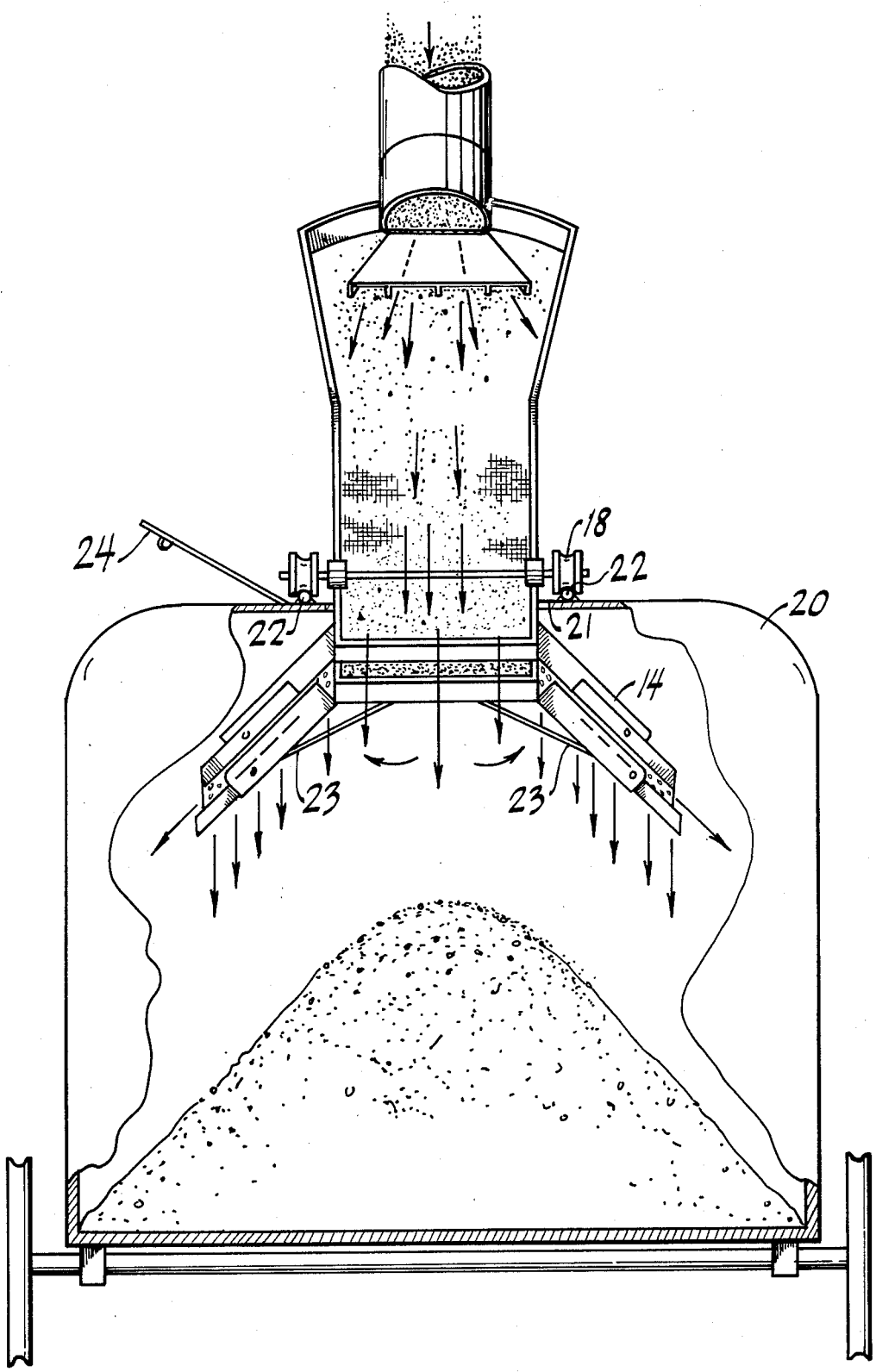
FIG. 2 is a front sectional view of the loading and mixing device as used for loading grain into a railway car.
Figure 4:
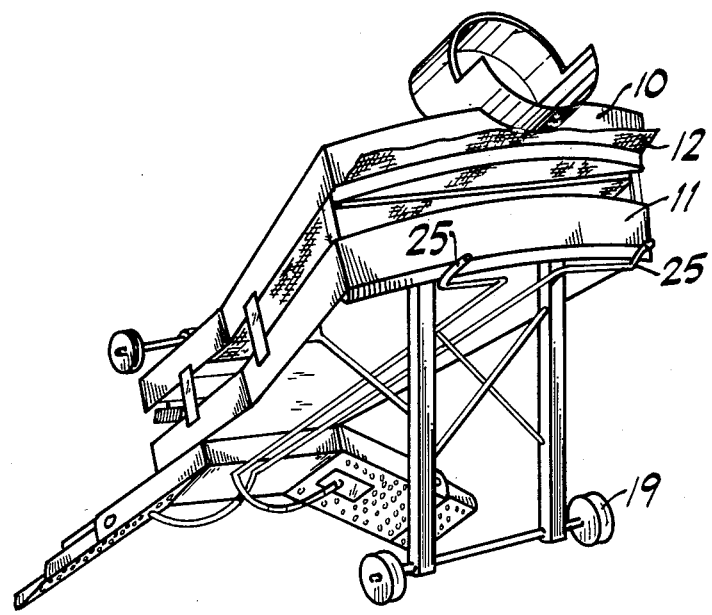
FIG. 4 is a rear perspective view of the loading and mixing device in FIG. 1.
Figure 5:
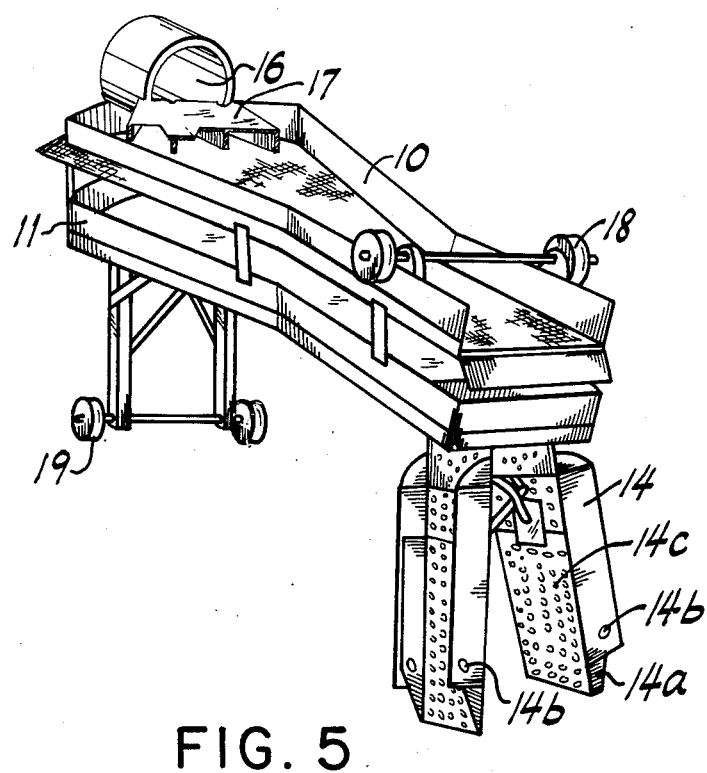
FIG. 5 is a front perspective view of the loading and mixing device wherein the wings of the front section are pivoted to the vertical position.

The loading device of the invention is shown in FIG. 2 in an operative position for loading grain into a railroad car 20. Railroad cars for carrying grain are basically of the same general construction. The car is usually divided into two compartments. A hatchway 21 is located on top of the car and runs approximately the length of the car. The hatchway opening can be from 17.5 inches wide to 26 inches wide. The hatchway has a pair of guide rails 22 running along the sides of the hatchway. Initially, when the front end of the loader is lowered into the hatchway, wings 14 are pivoted to the vertical position shown in FIG. 5. Within the railroad car, wings 14 are pivoted by levers 23 outward to about a 45 degree angle. When spread apart, the wings extend laterally approximately four to five feet wide. The length of each wing is adjustable by means of movable extension 14A secured in the desired position by a screw or bolt 14B. Trap door 24 is hinged to the top of the railroad car for closing the hatchway. The levers 23 for pivoting the wings of the loader are operated by handles 25 linked to the levers and extending from the rear of the device, as shown in FIG. 4.

Figure 3:
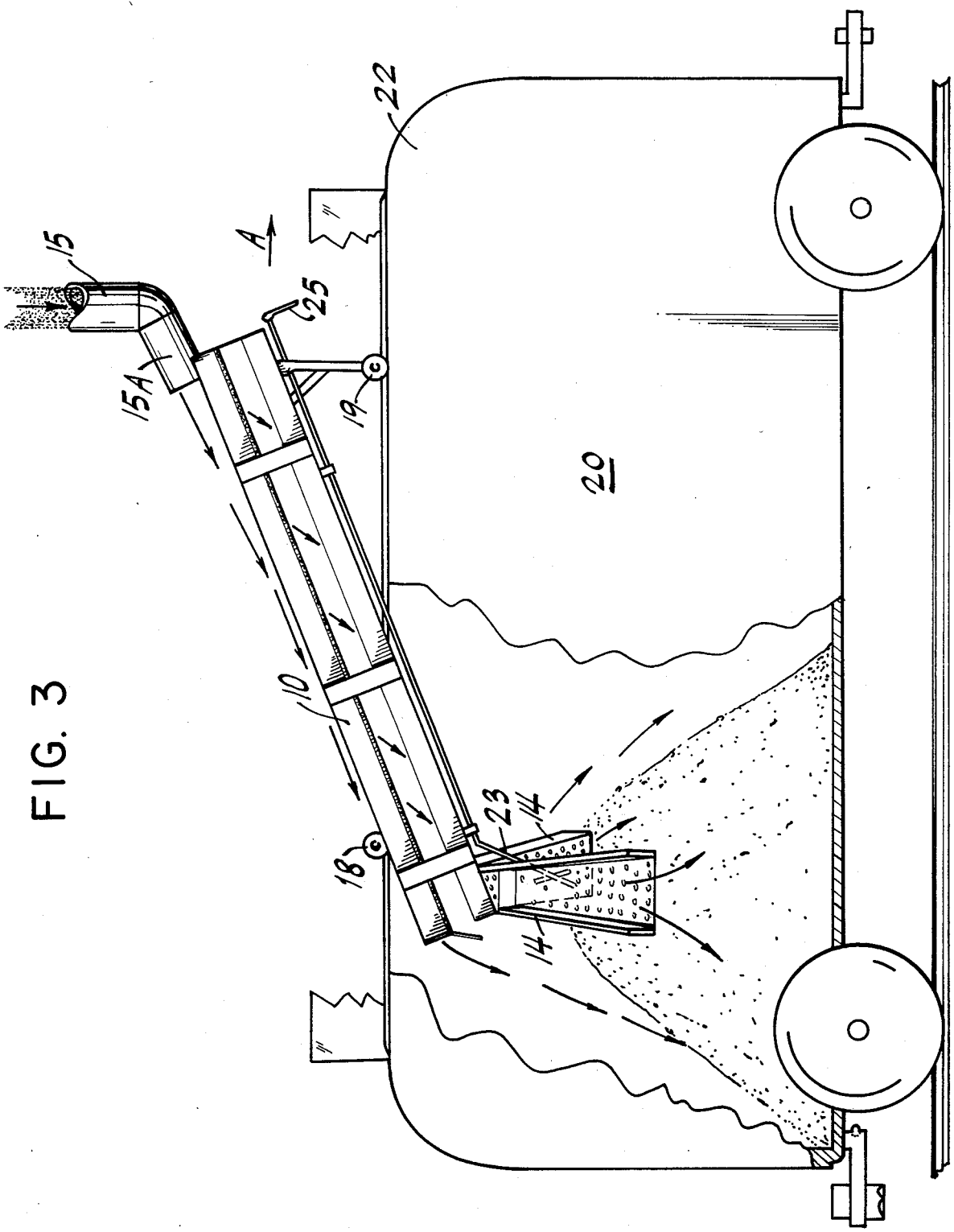
FIG. 3 is a side schematic view of the loading and mixing device used for loading grain in a railway car.

The operation of the loading device will now be described in sequence. As best seen in FIG. 3, the loader is placed in position on top of the railroad car 20. The front section is lowered into the hatchway with wings 14 pivoted vertically. When the front end has been lowered inside of the railroad car, handles 25 are turned so as to pivot levers 23 and move wings 14 to the outwardly angled position. The loader is generally positioned such that the front end is facing toward one end of the railroad car. Grain is then introduced through grain pipe 15 and directed by collar 16 and grating 17 into a downward flow over bottom screen 12 of upper chute 10. Foreign matter in the moving grain tends to fall through screen 12 to the lower chute 11, where it moves downwardly and to the sides channeled by wings 14. A screen or array of holes 14C is formed over the lengths of the bottom panels of wings 14 to distribute the foreign matter evenly from the sides in towards the center of the car. Similar openings may be provided in the bottom of the lower chute to distribute foreign matter over the center line of the chute as well.

Meanwhile, grain in the upper part of the flow over upper chute 10 continues downward and is channeled out the front end of the chute over the center and distributed by gravity to the sides of the railroad car. The loader is moved longitudinally over the hatchway, in the direction of arrow A in FIG. 3, so as to fill each compartment of railroad car 20. When the car is full, wings 14 are pivoted to the vertical position and the device is removed from the hatchway.

The loading device of the invention operates by directing the grain flow down the upper chute to fill towards the center and sides of the railroad car, while any foreign matter carried in the grain drops through the screen of the upper chute and is distributed by the lower chute and wings evenly from the sides in toward the center of the car. Thus, the foreign matter is distributed more or less evenly in the grain throughout the car, and the tendency of the lighter foreign matter to concentrate in the area under the hatchway when loaded by a conventional loader is thereby prevented. A sample taken from the hatchway will therefore contain a representative amount of foreign matter, rather than an erroneous higher concentration that would normally result using a conventional loader.

Although this invention is described with reference to the above material and components, it will be understood that a variety of modifications may be made without departing from the principles of the invention. All such modifications and obvious variations are intended to be included within the spirit and scope of the invention, as defined in the following claims.

We claim:

1. A device for loading granular material into a container and evenly distributing any foreign matter carried therein comprises:

an upper chute and a lower chute arranged in tandem one above the other, the upper chute having a floor which includes at least partly over the length thereof a screen for passing the foreign matter through to the lower chute;

means for introducing a grain flow at an inlet end and for discharging the grain flow at an outlet end of the upper chute into said container; and means for distributing the flow of foreign matter falling through to the lower chute from the upper chute transverse to the grain flow of the upper chute comprising a pair of wings extending at an angle to the center line of the lower chute and at an angle to a vertical plane through the center lines of the upper and lower chutes, said wings having bottom panels including means for distributing the flow of foreign matter across a width of the container.

2. The loading device of claim 1, wherein said means for distributing the flow of foreign matter across a width of the container comprises a plurality of holes formed in the bottom panels of said wings.

3. The loading device of claim 1, wherein said wings are pivotable from the angled position to a vertical position for inserting or removing the device through a hatchway of the container.

4. The loading device of claim 3, wherein said wings are pivoted by levers connected to handles extending proximate the inlet end of the device.

5. The loading device of claim 1, wherein the upper and lower chutes are of the same dimensions and have upstream portions near the inlet end which are wider than, and taper toward downstream portions of narrower width.

6. The loading device of claim 1 adapted for loading grain through a hatchway of a railroad car having guide rails extending along the sides of the hatchway, wherein said device further comprises supporting means including wheels for supporting and guiding the device over the rails of the hatchway.

7. The loading device of claim 1, further comprising a deflector grating at the inlet end for spreading the grain flow across the width of an upstream portion of the upper chute.

* * * * *